US 6,557,606 B1

(12) United States Patent
Duschek

(10) Patent No.: US 6,557,606 B1
(45) Date of Patent: May 6, 2003

(54) DEVICE AND METHOD FOR INSERTING A SECURITY AND/OR IDENTIFICATION ELEMENT BETWEEN TWO LAYERS OF A MARKING STRIP FOR ITEMS OF BAGGAGE

(75) Inventor: Detlef Duschek, Sensbachtal (DE)

(73) Assignee: Meto International GmbH, Hirschhorn (DE)

( * ) Notice: Subject to any disclaimer, the term of this patent is extended or adjusted under 35 U.S.C. 154(b) by 0 days.

(21) Appl. No.: 09/431,130

(22) Filed: Nov. 1, 1999

(30) Foreign Application Priority Data

Oct. 30, 1998 (DE) .......................................... 198 50 038

(51) Int. Cl.⁷ .......................... B32B 31/04; G06K 19/77
(52) U.S. Cl. ....................... 156/351; 156/361; 156/555; 156/556; 156/566; 156/584
(58) Field of Search ................................ 156/344, 584, 156/247, 249, 152, 351, 361, 555, 543, 556, 566

(56) References Cited

U.S. PATENT DOCUMENTS 4,330,350 A * 5/1982 Andrews ..................... 156/152
6,123,796 A * 9/2000 Kathmann et al. .......... 156/152

FOREIGN PATENT DOCUMENTS

| DE | 3244430 A1 | 11/1984 |
| DE | 4110147 A1 | 10/1992 |
| DE | 4436284 A1 | 4/1996 |
| DE | 19609180 A1 | 9/1997 |

* cited by examiner

Primary Examiner—Richard Crispino
Assistant Examiner—Cheryl N. Hawkins
(74) Attorney, Agent, or Firm—Jones, Tullar & Cooper, P.C.

(57) ABSTRACT

The present invention is directed to a device and a method for inserting a security and/or identification element between two layers of a marking strip for items of baggage, the two layers being an overlayer and a substrate joined together at least in sub-sections by way of an adhesive layer which adheres to the overlayer when the substrate is delaminated. The marking strips are manufactured with integrated security/identification elements at low cost. The marking strips are available in web form and are guided in a running direction past a vacuum source. The vacuum source is switched on as soon as a severing cut of a marking strip enters the range of action of the vacuum source, whereby the substrate is lifted from the overlayer of a marking strip so that a security/identification element is disposed onto the overlayer or the substrate, and that the running direction of the marking strip is reversed as soon as the leading section of the security/identification element adheres to the overlayer or the substrate, whereby the overlayer and the substrate of a marking strip are brought together again and the security/identification element is inserted between the two layers.

10 Claims, 3 Drawing Sheets

DEVICE AND METHOD FOR INSERTING A SECURITY AND/OR IDENTIFICATION ELEMENT BETWEEN TWO LAYERS OF A MARKING STRIP FOR ITEMS OF BAGGAGE

FIELD OF THE INVENTION

This invention relates to a device and a method for inserting a security and/or identification element between two layers of a marking strip for items of baggage, the two layers being an overlayer and a substrate joined together at at least in sub-sections by way of an adhesive layer, with the adhesive layer adhering to the overlayer when the substrate is delaminated. In implementing the method of the present invention, a plurality of marking strips in successive arrangement are processed as web material in a device of the present invention. The substrate of the web of the marking strips is interrupted at regular intervals.

The present invention further relates to a marking strip manufactured in accordance with the method aspect of the present invention.

BACKGROUND OF THE INVENTION

Marking strips are used preferably for the identification of baggage items at airports. Essential information such as the passenger's name, destination, bar codes, etc. is printed on the overlayer of the oblong marking strip. The substrate is then removed at least in certain sections. The marking strip is looped around the handle of the baggage and in those sections where the adhesive layer lies exposed is adhered to opposite sections of the marking strip.

A preferred embodiment of such a marking strip is described in European Patent, EP 0 568 843 B1. This marking strip has a main part and an adjacent separable control section which follows in longitudinal direction, with the control section and an adjacent section of the main part having on the rear side an adhesive coating covered by a silicone-coated surface strip. The surface strip has in the area of the main part a strongly adhering section on its side facing the main part. To enable the surface strip to be affixed to the marking strip in one operation when joining together the two parts, the silicone coating is neutralized in the strongly adhering section or is covered by an adhesive layer. The marking strip described in this European patent specification is ideally suited for being manufactured with the method of the present invention, because the surface strip is interrupted at regular intervals. In the areas of the ends of the surface strip the possibility exists to position an identification element between the two strips using the method of the present invention.

However, the art also knows of other marking strips comprised of at least one continuous substrate and at least one continuous overlayer. All these marking strips can be provided with identification elements according to the method of the present invention if a serving cut is present in at least one of the aforementioned layers, the cut extending orthogonally to the longitudinal direction of the marking strip and hence interrupting the respective layer, so that it is again possible in the area of the severing cut to position a marking element between the interrupted and a continuous layer.

In this connection it is irrelevant whether the severing cut already exists in a layer of the marking strip or whether provision is made for a further device at a suitable site of the device of the present invention to provide the severing cuts in the respective layer.

SUMMARY OF THE INVENTION

It is an object of the present invention to provide an economical marking strip with an integrated security/identification element as well as a suitable method and a suitable device for the manufacturing of such a marking strip.

As regards the device, this object is accomplished by providing a supply reel with marking strips in web form, by providing a roll pair consisting of a vacuum roll and a platen roll, with the marking strips being guided through the roll gap between the vacuum roll and the platen roll, by providing a dispensing device for security and/or identification elements, by providing a control device which controls the device so that one security/identification element is placed between the overlayer and the substrate of the marking strip, and by providing a take-up reel onto which the marking strips with the inserted security/identification elements are subsequently wound.

According to an advantageous further aspects of the device of the present invention, one servo motor each is operatively associated with the supply reel, the vacuum roll and the take-up reel. As a result of this arrangement it is possible to adapt the device without difficulty to any dimensions of the marking strips and/or security/identification elements. Hence the device can be put to universal use.

According to a low-cost embodiment of the device of the present invention, the dispensing device is comprised of a supply reel, a dispensing edge and a take-up reel. In this embodiment, too, respective servo motors are operatively associated with the supply reel and the take-up reel in order to increase the flexibility of the device.

An advantageous embodiment of the device of the present invention provides for the dispensing edge to be positioned in the vicinity of the roll gap between the vacuum roll and the platen roll. Further, a favorable aspect of the device of the present invention proposes positioning a first sensor between the platen roll and the take-up reel, the sensor supplying the control device with information about the respective position of a marking strip. Provision is also made for a second sensor which supplies the control device with information about the position of a security/identification element. The security/identification element is preferably an integrated circuit having assigned to it a resonant circuit for the purpose of exchanging data with an interrogating unit. By inserting such a security/identification element the interrogating unit always has access to essential information about the baggage item to which the security/identification element is attached. Furthermore, it is no longer necessary, as with the reading of bar codes, for example, for the source of information to be passed in the direc vicinity of the interrogating unit.

To make it easy for the control device to recognize the severing cut at which the substrate is lifted from the overlayer in order to insert the security/identification element, a marker designed to be readily detected by the sensor is applied to the marking strip. This maker is, for example, a wide transverse line which is readily detectable by an optical contrast sensor. It will be appreciated that any other markers may be used in conjunction with the present invention, provided they are clearly identifiable by the sensor used. As a rule, suitable markers are anyway applied for printing commercially available marking strips so that no additional markers are necessary.

A preferred embodiment of the device of the present invention provides for the sensor to be positioned between the roll gap and the take-up reel, the sensor's relative distance to the roll gap being made to equal the relative distance of the marker to the serving cut in the substrate of a marking strip, and for the vacuum roll to be switched on once the sensor detects a marker and relays a corresponding signal to the control device. Hence in this preferred embodiment of the device of the present invention, the recording of the marker by the sensor is directly coupled to the activation of the vacuum roll.

The object of the present invention with respect to the method is accomplished by providing the marking strips in web form and guiding them in a running direction past a vacuum source; the vacuum source is switched on as soon as a severing cut in one of the two layers of one of the marking strips enters the range of action of the vacuum source, whereby the substrate interrupted by the severing cut is lifted from the other layer of this particular marking strip: a security/identification element is dispensed onto the overlayer or substrate in the predetermined section; the running direction of the running strips is then reversed, and the vacuum source is switched off at the latest when the overlayer and the substrate of a marking strip are brought together again and the security/identification element is inserted between the two layers; finally, the marking strips are moved on again in the original running direction.

According to a preferred embodiment of the method of the present invention, the instants of time when the running direction of the marking strip is reversed and the vacuum source is switched on and off are fixed by way of a control device and servo motors. The advantage of this embodiment compared to a pure hardware solution is that the method of the present invention and the device of the present invention can be modified without great difficulty to enable the processing of marking strips and security/identification elements of any size.

As previously mentioned, an advantageous further aspect of the method of the present invention provides for determining the position of the marking strips and/or the position of the security/identification elements by means of sequence.

According to a preferred aspect of the method of the present invention, the security/identification elements are affixed to a supporting web by means of an adhesive whose adhesion relative to the security/identification elements is greater than it is relative to the supporting web; the security/identification elements are lifted off the supporting web at the dispensing edge of the dispensing device and applied with their non-adhesive-coated side to the overlayer coated with adhesive. This ensures in a simple manner that, after the substrate is joined to the overlayer, the adhesive force in the area of an inserted security/identification element is the same as outside this area.

The object of the present invention with respect to the marking strip manufactured in accordance with the method of the present invention for the security and identification of baggage items is accomplished in that the marking strip is comprised of an overlayer and a substrate which are joined together at least in sub-sections by way of an adhesive layer, in that the adhesive layer adheres to the overlayer when the substrate is delaminated, and in that a security/identification element is placed in a predetermined section between the overlayer and the substrate.

The present invention will be explained in more detailed in the following with reference to the accompanying drawing.

DESCRIPTION OF THE PREFERRED EMBODIMENTS

Figure 1:
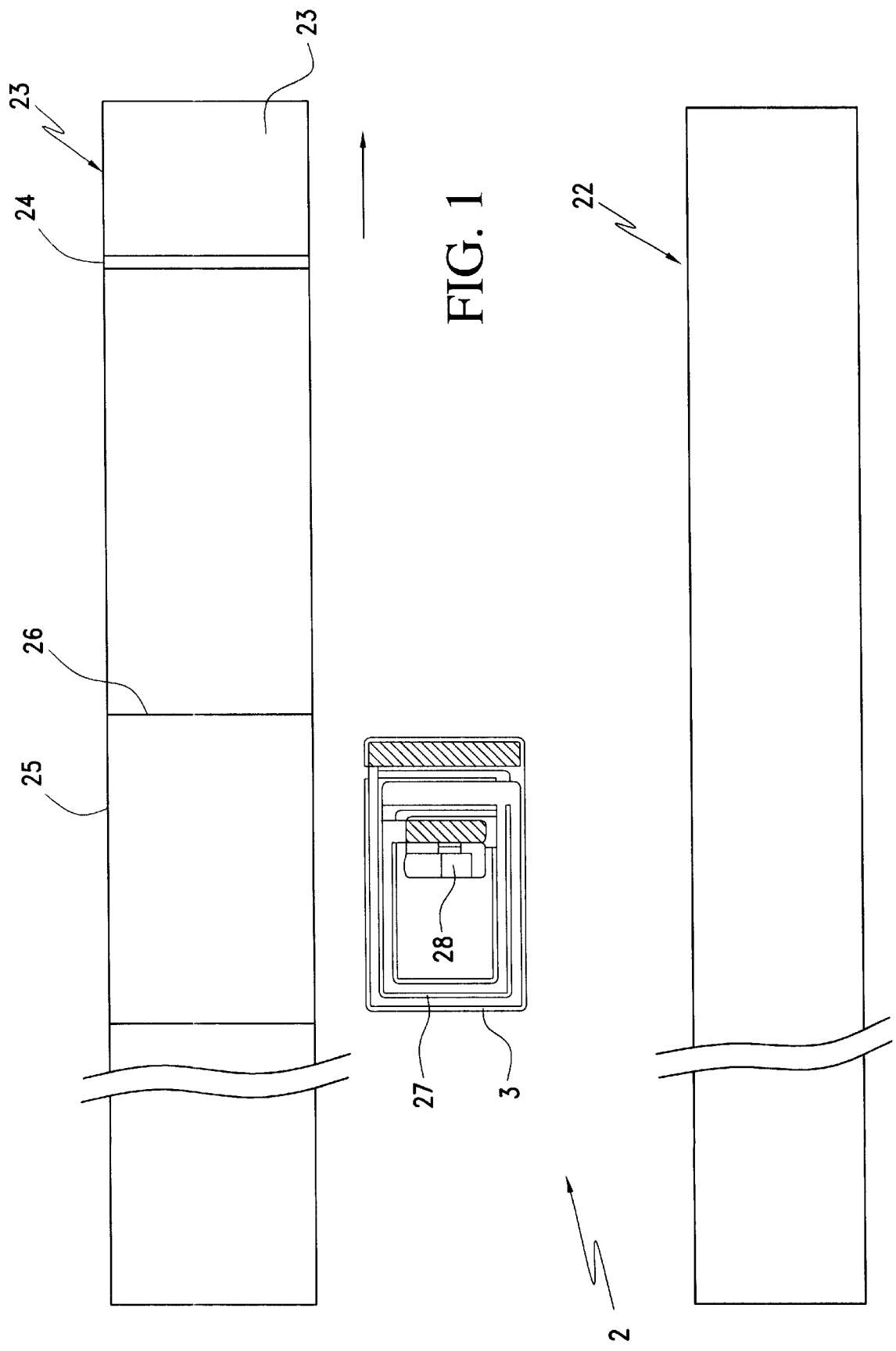
FIG. 1 is an exploded view of a marking strip constructed in accordance with the present invention.

FIG. 1 shows an exploded view of a marking strip 2 of the present invention. The marking strip 2 is comprised of a substrate 23, a security/identification element 3 which is adhered to a predetermined section 25 of the marking strip 2, and an overlayer 22. A marker 24 is applied to the outside of the substrate 23. In this particular case the marker is a dark strip applied across the running direction of the marking elements in the device of the present invention. Furthermore, the substrate 23 has a severing cut 26, whose function will be described in greater detail in conjunction with FIG. 2. It will be understood that this severing cut may also coincide with the marker 24 or the end of the strip. Moreover, the possibility exists to provide the overlayer with the severing cut and to leave the substrate continuous.

In the case of the illustrated configuration of the marking strip 2 of the present invention, the security/identification element 3 is comprised of a resonant circuit 27 connected electrically to an integrated circuit 28. The marking strip 2 is designed long enough to be looped without difficulty around the handle of a piece of baggage and be fixed in this position.

Figure 2:
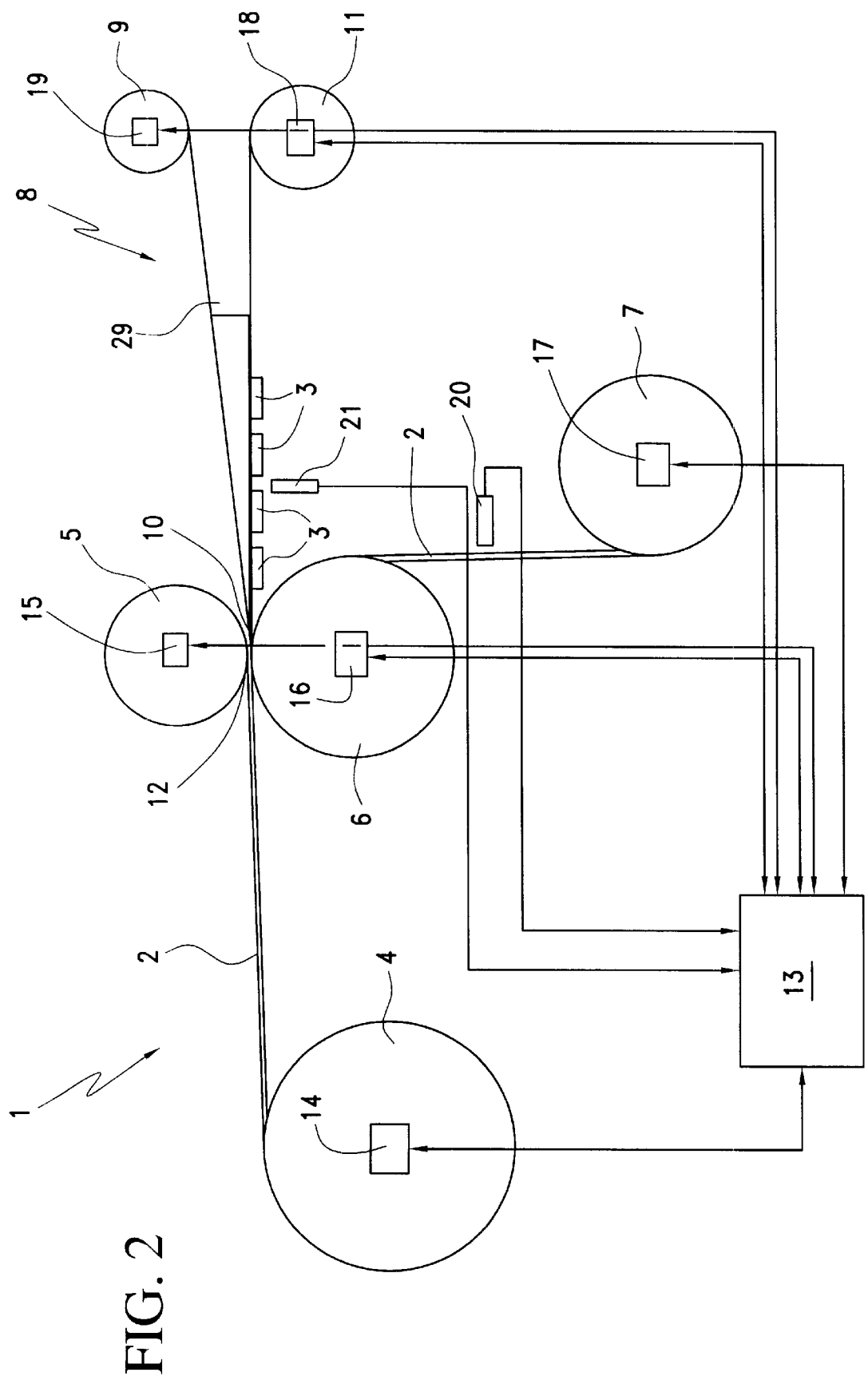
FIG. 2 is a side view of an advantageous embodiment of the device of the present invention.

FIG. 2 shows a side view of an advantageous embodiment of the device 1 of the present invention. The marking strips 2 are available as web material and wound on a supply reel 4. The web material with the marking strips 2 is guided through a roll gap 12 formed between a platen roll 6 and a vacuum roll 5 placed against the platen roll 6. The web material with the marking strips 2 is wound onto the take-up reel 7 after a security/identification element 3 has been inserted in the predetermined section 25 of each marking strip 2.

The dispensing edge 10 of the dispensing device 8 for the security/identification elements 3 is positioned in the direct vicinity of the roll gap 12. The security/identification elements 3 are arranged on a supporting web 29. The supporting web 29 is wound off the supply reel 11 and guided over the dispensing edge 10 to the take-up reel 9 where it is rewound. At the dispensing edge 10 the security/identification elements 3 are removed from the supporting web 29 and dispensed onto the overlayer 22 of the marking strips 2 in such a way that each security/identification element 3 is positioned in the predetermined section 25.

A control device 13 is provided to ensure that the security/identification elements 3 are applied correctly to the predetermined sections 25 of the marking strips 2. The control device 13 receives the essential information about the positions of the marking strips 2 and the security/identification elements 3 from the sensors 20, 21, controlling their running direction and/or running speed by way of servo motors 14, 15, 16, 17, 18, 19. The servo motors 14, 15, 16, 17, 18, 19 preferably have integrated phase-angle sensors and are operatively associated with the rolls/reels 4, 5, 6, 7, 9, 11.

An alternative embodiment provides only for the vacuum roll 5 or only for the platen roll 6 of the two rolls to be associated with a servo motor 15 or 16. In this case torque is transmitted to the other roll from the roll actively driven by a servo motor using simple mechanical means, as meshing gears, or just by way of the friction occurring in the roll gap 12. The economic advantage of this embodiment is obvious in view of the cost savings realized by the absence of the servo motor 15 or 16 and the expenditure involved in the control of, and power supply to, the motor.

In the embodiment of the device of the present invention shown in FIG. 2, the relative distance of the sensor 20 to the roll gap 12—as seen looking in the running direction of the marking strips 2—is equal to the relative distance of the marker 24 to the severing cut 26. At the instant of time when the sensor 20 detects the marker 24, the severing cut 26 in the substrate 23 lies in the roll gap 12 between the vacuum roll 5 and the platen roll 6. The sensor 20 transmits the detection signal to the control device 13 via the connecting line. Thereupon the control device 13 activates the vacuum roll. As a result of the vacuum prevailing on the surface of the vacuum roll 5, the substrate 23 is lifted downstream from the severing cut 26—as seen looking in the running direction—and fixedly held in place on the circumference of the vacuum roll 5. At the instant of time when the section predetermined for placement of the identification element is reached, the control device 13 activates the dispensing device 8 which then causes a security/identification element 3 to be applied to the adhesive-coated side of the overlayer 22 at the predetermined point of the marking strip 2. The position of the security/identification element 3 is monitored by the sensor 21 to enable this dispensing operation to be performed correctly. Once the dispensing operation begins, the control device 13 changes the direction of rotation of the rolls/reels 4, 5, 6, 7, whereby the running direction of the marking strips 2 changes and the substrate 23 is re-laminated with the overlayer 22.

As soon as a security/identification element 3 is fully dispensed, the control device 13 stops the reels 9, 11 of the dispensing device 8. The vacuum roll 5 is deactivated at the latest when the reels/rolls 4, 5, 6, 7 are reversed again in the original running direction. This new change of running direction takes place—as previously mentioned—as soon as the substrate 23 and the overlayer 22 of a marking strip 2 are laminated together and the security/identification element 3 is integrated in the required section 25 of the marking strip 2. The process is repeated as soon as the sensor 20 detects the next marker 24.

Figure 3:
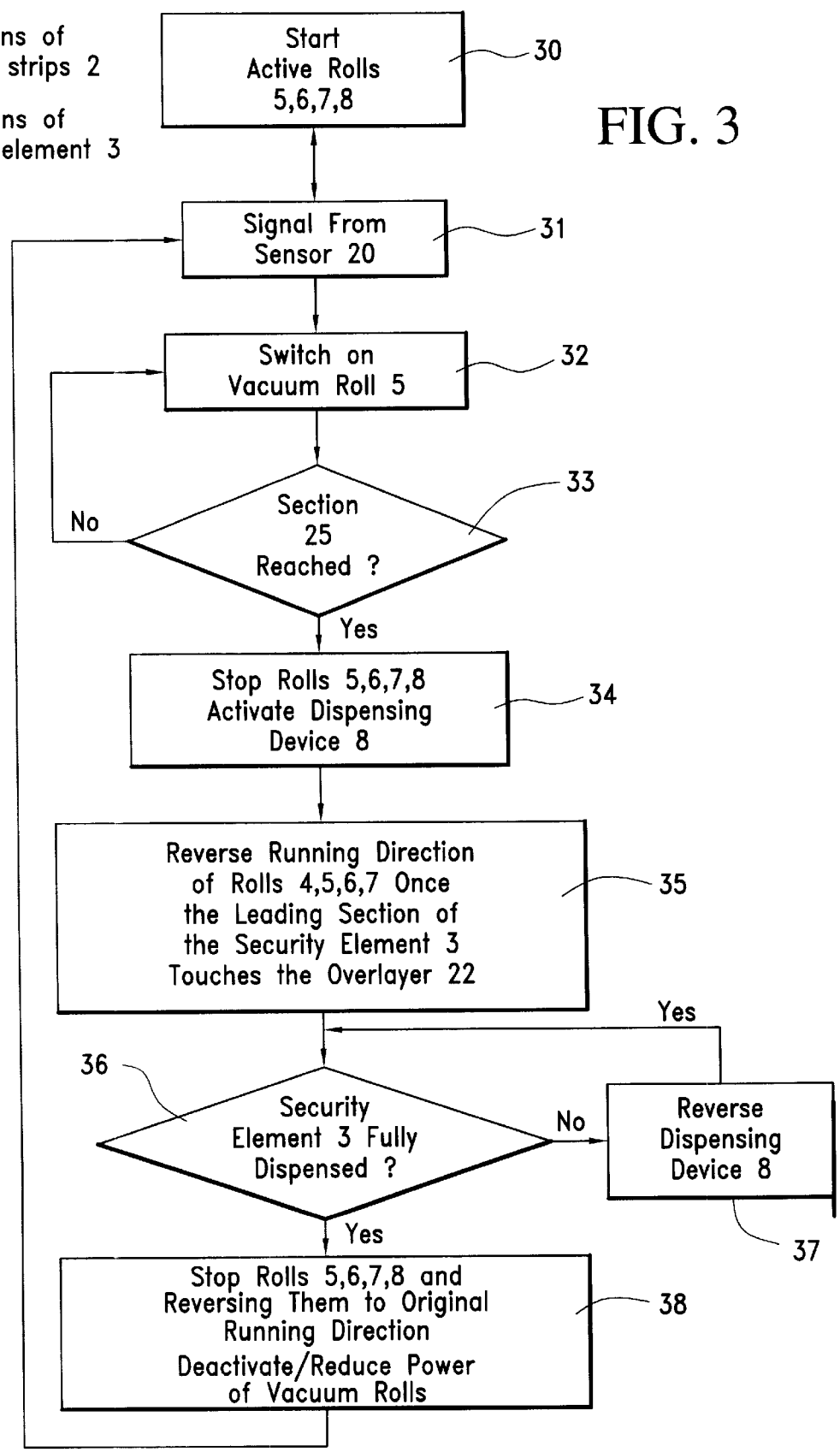
FIG. 3 is a flowchart for operating the control device to execute an advantageous embodiment of the method of the present invention.

FIG. 3 shows a flowchart of the operation of the control device 13 designed to implement an advantageous embodiment of the method of the present invention. The device used is that of the embodiment of FIG. 2.

For the control device 13 to be able to perform the method correctly, it needs information about the dimensions of the marking strips 2 and security/identification elements 3. The program is started at point 30. As soon as the sensor 20 issues a signal to the control device 13 that it has detected a marker 24 (program point 31), the control device 13 prompts the activation of the vacuum roll 5 under program point 32. Under program point 33 a check is carried out to see whether the section 25 of the marking strip 2, in which the security/identification element 3 is to be placed, has been reached. Once the section 25 is reached (point 34), the dispensing device 8 is activated, resulting in the security/identification element 3 being positioned in the predetermined section 25.

The forward movement of the marking strip 2 is stopped as soon as the leading (as seen looking in the running direction of the dispensing device 8) section of the security/identification element 3 has been dispensed onto the layer 22 (program point 35). Under point 35 the control device 13 then prompts the rolls/reels 4, 5, 6, 7 to be reversed in the opposite running direction, with the result that the security/identification element 3 can be placed fully onto the overlayer. The dispensing device 8 is deactivated as soon as the security/identification element 3 has been dispensed fully onto the overlayer 22 (program points 36, 37). At program point 38 the rolls 4, 5, 6, 7 are reversed again in the original direction and the vacuum roll 5 is deactivated or its suction power reduced, with the result that the substrate 23 no longer clings to the vacuum roll 5 and is laminated with the overlayer 22 in the roll gap at the latest.

The process is repeated in cycles as soon as the next marker 24 enters the field of view of the sensor 20. (The first marker belongs to the marking strip 2 in which a security/identification element 3 was previously integrated.)

What is claimed is:

1. A device for inserting a security and/or identification element between two layers of a marking strip for items of baggage, and two layers being an overlayer and a substrate joined together at least in sub-sections by way of an adhesive layer, said adhesive layer adhering to the overlayer when the substrate is delaminated, one of the overlayer and the substrate comprising a severing cut, comprising:

a supply reel with marking strips in web form;

a reversing roll pair consisting of a vacuum roll and a platen roll, said marking strips being guided through a roll gap between said vacuum roll and said platen roll;

a dispensing device for security and/or identification elements;

a control device which controls the device for inserting so that the overlayer and the substrate are lifted from each other at the severing cut, one security/identification element is placed between the overlayer and the substrate of the marking strip, and subsequently, upon reversing the roll pair, the overlayer and the substrate are brought together again; and a take-up reel onto which the marking strips with the inserted security/identification elements are subsequently wound.

2. The device as claimed in claim 1, wherein one servo motor each is operatively associated with the supply reel and the take-up reel as well as the vacuum roll or the platen roll, torque being transmitted to the roll not directly driven by a servo motor from the roll driven by a servo motor using mechanical means.

3. The device as claimed in claim 1, wherein one servo motor each is operatively associated with the supply reel, the take-up reel, the vacuum roll and the platen roll.

4. The device as claimed in claim 1, wherein said dispensing device is comprised of a supply reel, a dispensing edge and a take-up reel.

5. The device as claimed in claim 4, wherein said dispensing edge is positioned in the vicinity of the roll gap between said vacuum roll and said platen roll.

6. The device as claimed in claim 4, wherein a servo motor is operatively associated with said supply reel and said take-up reel, respectively, of said dispensing device.

7. The device as claimed in claim 1, wherein a first sensor is positioned between said platen roll and said take-up reel, said first sensor supplying said control device with information about the position of a marking strip.

8. The device as claimed in claim 6, wherein a second sensor is provided, which supplies said control device with information about the position of said security/identification element.

9. The device as claimed in claim 7, wherein a marker designed to be detected by said first sensor is applied to the marking strip.

10. The device as claimed in claim 9, wherein said first sensor is positioned between said roll gap and said take-up reel, said first sensor's relative distance to said roll gap being made to equal the relative distance of the marker to a severing cut in the substrate of a marking strip behind which the security/identification element is placed, and wherein said vacuum roll is switched on once said first sensor detects a marker and relays a corresponding signal to said control device.

* * * * *